Patented Jan. 24, 1933

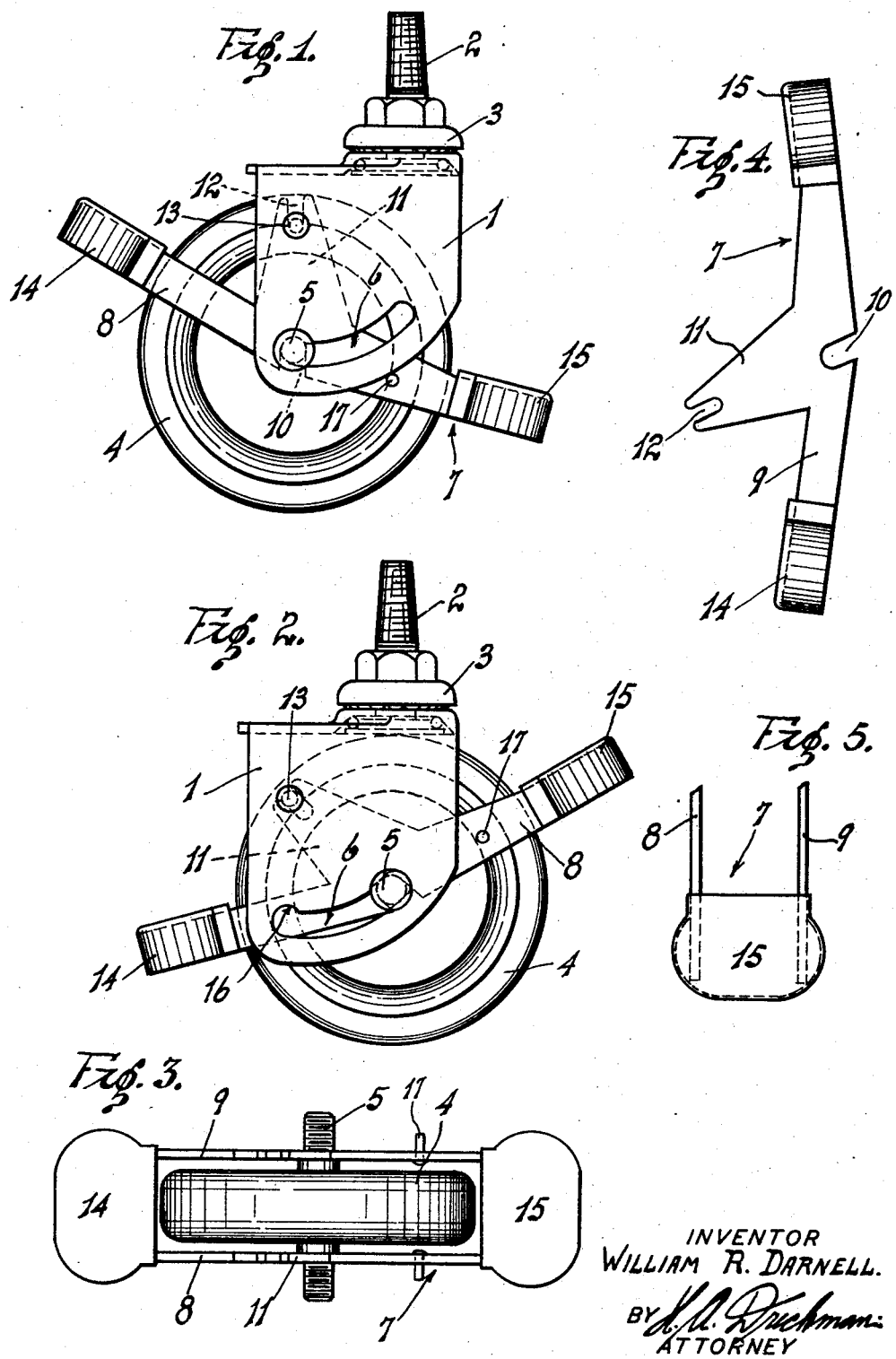

1,895,150

UNITED STATES PATENT OFFICE

WILLIAM R. DARNELL, OF LONG BEACH, CALIFORNIA, ASSIGNOR TO THE DARNELL CORPORATION, LTD., OF LONG BEACH, CALIFORNIA, A CORPORATION OF DELAWARE

ADJUSTABLE WHEEL CASTER

Application filed March 5, 1932. Serial No. 597,000.

This invention relates to an adjustable wheel caster of the type which can be so arranged as to be either revolvable or stationary as desired.

An object of my invention is to provide a novel adjustable wheel caster which can be quickly and easily shifted into either the rolling or stationary position without materially disturbing the vertical position of the article supported by the caster.

Another object is to provide an adjustable wheel caster of the character stated which is inexpensive to construct, effective in operation, and simple in its arrangement.

A further object is to provide a caster of the character stated which is held in either rolling or stationary position, and which will not readily change from one to the other without first being purposely actuated by the operator.

Other objects, advantages and features of invention may appear from the accompanying drawing, the subjoined detailed description and the appended claims.

In the drawing

Figure 1 is a side elevation of my caster in rolling position.

Figure 2 is a side elevation of the same in stationary position.

Figure 3 is a top plan view of the wheel with the shift frame mounted thereon.

Figure 4 is a side elevation of the shift frame.

Figure 5 is a fragmentary, plan view of one end of the shift frame.

Referring more particularly to the drawing, the numeral 1 indicates a U shaped frame from the top of which a mounting member 2 rises. This mounting member may, if desired, be mounted on antifriction bearings 3, although this is not essential. A wheel 4 is adjustably mounted in the yoke 1 and is adapted to be moved either into contact with a stationary part of the yoke as shown in Figure 2 or it may be moved out of contact with this stationary part as shown in Figure 1, and is thus freely rotatable.

The wheel 4 is mounted on an axle 5 and the ends of this axle extend into arcuate slots 6 in the yoke 1. The slots 6 are so arranged that when the axle is at one end thereof the wheel is slightly lowered and is thus free to rotate. When the axle is at the other end of the slots the wheel is slightly raised and the periphery thereof engages the upper surface of the yoke 1 or the mounting for the pin 2. In either event, the wheel is engaging a stationary part of the caster and therefor is held against rotation. In the stationary position of the wheel, the center thereof is subsequently in vertical alignment with the center line of the pin 2. Whereas, in the rolling position of the wheel, the center thereof is to the side of the center line of the pin and will therefor swivel around the pin as usual with casters.

The wheel is shifted from one end of the slot 6 to the other by means of a shift frame 7. The frame consists of two side arms 8 and 9 which are positioned one on either side of the wheel. Each arm is provided with a notch 10 extending from the lower edge thereof, and the axle 5 fits into these notches. On each of the arms, I provide an integral lug 11 which extends upwardly therefrom. The upper end of each of the lugs is bifurcated as at 12. A pin 13 projects inwardly from each side of the yoke 1, and these pins extend into the bifurcations in the ends of the lugs 11. The arms 8 and 9 are thus mounted on the pins 13, but the bifurcations permit the arms to move relative to the pins as the axle 5 moves from one end of the slot 6 to the other. Caps 14 and 15 are mounted on the ends of the arms 8 and 9, thus securing the arms together and also providing a convenient surface against which to press when the wheel is shifted from one position to another.

At the lower end of the slot 6, I provide a recess 16 in which the axle 5 rests when the wheel is in rolling position. The purpose of this recess is to hold the wheel against accidental displacement when in rolling position. The recess is in the top of the slot 6, and consequently the upward thrust on the axle 5 will hold the wheel securely in this position. In order that the axle 5 may be easily removed from the recess 16, I provide a lever pin 17 in the arms 8 and 9 and this pin bears against the lower arcuate edge of the yoke 1 when the wheel is in rolling position.

The lever pin acts as a fulcrum for the purpose of swinging the axle downwardly and thus out of the recess 16 when pressure is exerted on the cap 14. When the axle is once in the slot 6 it will readily move upwardly into the position shown in Figure 2. In this position the periphery of the wheel contacts the lower surface of the mounting for the pin 2 and is therefor held against rotation.

Having described my invention, I claim:

1. An adjustable wheel caster comprising a yoke, said yoke having arcuate slots formed therein, a wheel, an axle on which the wheel is mounted, the ends of said axle extending into the slots, a shift frame comprising a pair of arms positioned one on either side of the wheel, said arms being provided with a notch into which the axle fits, a lug rising from each arm, and means pivotally mounting said lugs on the yoke, a lever pin on the arms, said lever pin engaging the edge of the yoke when the wheel is in rolling position, and said slot having a recess at one end thereof into which the axle fits when the wheel is in rolling position.

2. An adjustable wheel caster comprising a yoke, said yoke having arcuate slots formed therein, a wheel, an axle on which the wheel is mounted, the ends of said axle extending into the slots, a shift frame comprising a pair of arms positioned one on either side of the wheel, said arms being provided with a notch into which the axle fits, a lug rising from each arm, inwardly extending pins on said yoke, the ends of said lugs being bifurcated to fit over said pins, a lever pin on the arms, said lever pin engaging the edge of the yoke when the wheel is in rolling position, and said slot having a recess at one end thereof into which the axle fits when the wheel is in rolling position.

In testimony whereof, I affix my signature.

WILLIAM R. DARNELL.